United States Patent
Rhodes

(10) Patent No.: US 7,158,486 B2
(45) Date of Patent: Jan. 2, 2007

(54) METHOD AND SYSTEM FOR FAST COMPUTATION OF ROUTES UNDER MULTIPLE NETWORK STATES WITH COMMUNICATION CONTINUATION

(75) Inventor: David L. Rhodes, Brick, NJ (US)

(73) Assignee: OpCoast LLC, Brick, NJ (US)

( * ) Notice: Subject to any disclaimer, the term of this patent is extended or adjusted under 35 U.S.C. 154(b) by 920 days.

(21) Appl. No.: 10/095,862

(22) Filed: Mar. 12, 2002

(65) Prior Publication Data
US 2002/0172157 A1 Nov. 21, 2002

Related U.S. Application Data

(60) Provisional application No. 60/274,462, filed on Mar. 12, 2001.

(51) Int. Cl.
*H04L 12/28* (2006.01)
(52) U.S. Cl. .................................................. 370/256
(58) Field of Classification Search ........ 370/254–258, 370/351, 389
See application file for complete search history.

(56) References Cited

U.S. PATENT DOCUMENTS

| | | | |
|---|---|---|---|
| 4,644,532 A | 2/1987 | George et al. ............... 370/94 |
| 4,864,559 A * | 9/1989 | Perlman ..................... 370/256 |
| 4,939,726 A | 7/1990 | Flammer et al. ........... 370/94.1 |
| 5,090,011 A | 2/1992 | Fukuta et al. ................ 370/60 |
| 5,233,604 A | 8/1993 | Ahmadi et al. .............. 370/60 |
| 5,353,283 A | 10/1994 | Tsuchiya .................... 370/60 |
| 5,367,523 A | 11/1994 | Chang et al. ................ 370/84 |
| 5,400,329 A | 3/1995 | Tokura et al. ............... 370/84 |
| 5,535,195 A * | 7/1996 | Lee ........................... 370/256 |
| 5,563,875 A | 10/1996 | Hefel et al. .................. 370/15 |
| 5,881,051 A | 3/1999 | Arrowood et al. ......... 370/248 |
| 5,881,243 A * | 3/1999 | Zaumen et al. ............ 709/241 |
| 5,987,521 A | 11/1999 | Arrowood et al. ......... 709/239 |
| 6,038,216 A | 3/2000 | Packer ....................... 370/231 |
| 6,091,709 A | 7/2000 | Harrison et al. ........... 370/235 |
| 6,091,725 A | 7/2000 | Cheriton et al. ........... 370/392 |
| 6,122,283 A * | 9/2000 | Lee ........................... 370/408 |
| 6,130,890 A | 10/2000 | Leinwand et al. ......... 370/400 |
| 6,134,589 A | 10/2000 | Hultgren ................... 709/227 |
| 6,147,971 A * | 11/2000 | Rochberger et al. ....... 370/238 |
| 6,256,309 B1 * | 7/2001 | Daley et al. ........... 370/395.43 |
| 6,393,386 B1 * | 5/2002 | Zager et al. ................. 703/25 |
| 6,400,681 B1 * | 6/2002 | Bertin et al. ............... 370/218 |
| 6,529,498 B1 * | 3/2003 | Cheng ....................... 370/351 |
| 6,560,654 B1 * | 5/2003 | Fedyk et al. ............... 709/239 |
| 6,563,798 B1 * | 5/2003 | Cheng ....................... 370/255 |
| 6,600,724 B1 * | 7/2003 | Cheng ....................... 370/256 |
| 6,628,670 B1 * | 9/2003 | Galand et al. ............. 370/468 |
| 6,646,989 B1 * | 11/2003 | Khotimsky et al. ........ 370/238 |
| 6,667,957 B1 * | 12/2003 | Corson et al. ............. 370/238 |
| 6,728,205 B1 * | 4/2004 | Finn et al. ................. 370/217 |
| 6,765,880 B1 * | 7/2004 | Hillard et al. ............. 370/255 |

* cited by examiner

*Primary Examiner*—Dmitry Levitan
(74) *Attorney, Agent, or Firm*—Davidson, Davidson & Kappel, LLC

(57) ABSTRACT

A system and method for network routing is provided where significant (those that impact optimal network routes) state changes of network components are considered. A set of optimal communication paths are generated for a number of actual and potential component failure scenarios. An optimal communication path is generated for each failure scenario. In addition, a method that enables continued communication using intermediate routing points and routing update propagation during periods of network non-convergence or congestion is disclosed.

14 Claims, 11 Drawing Sheets

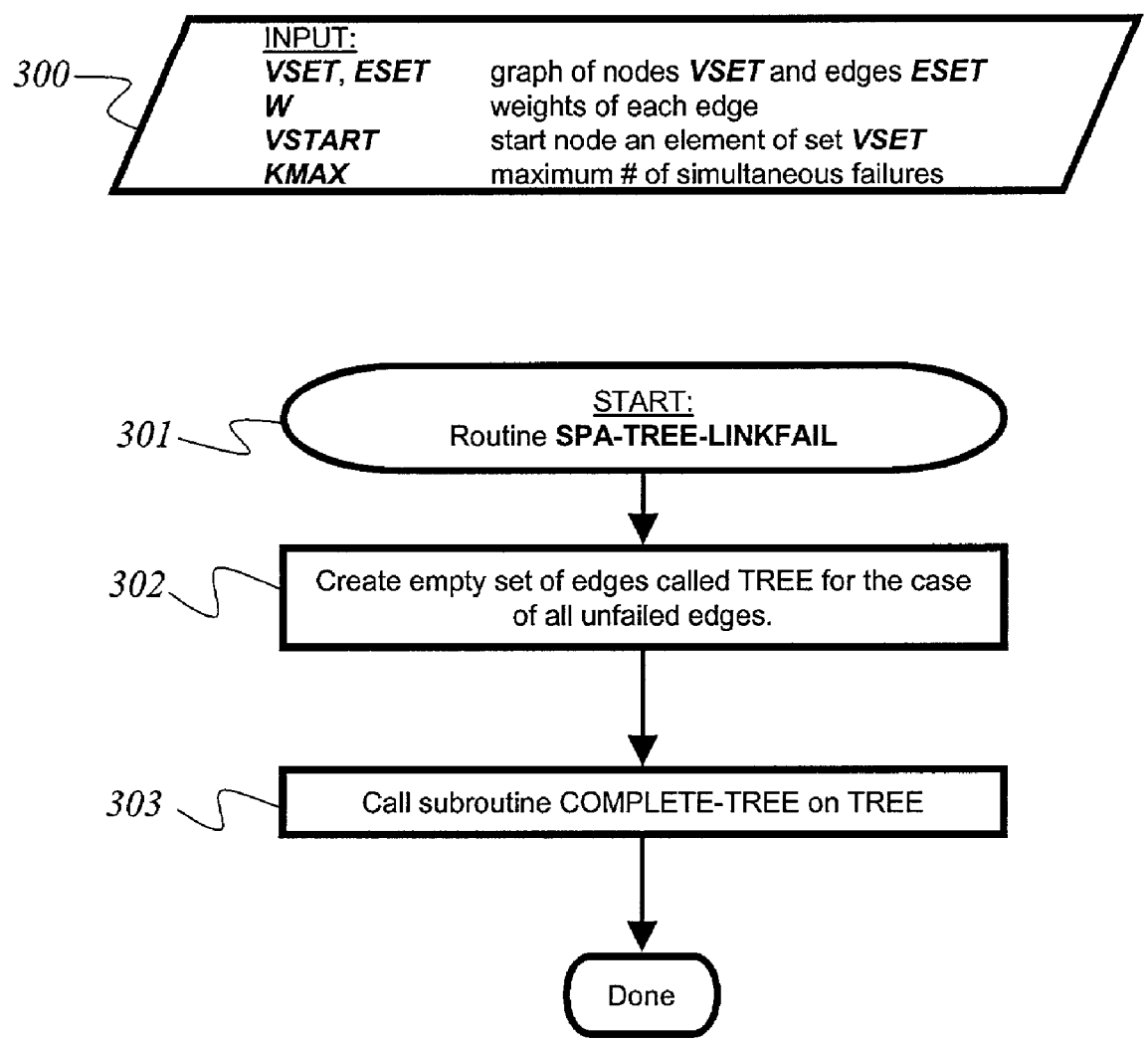
FIG. 3.a

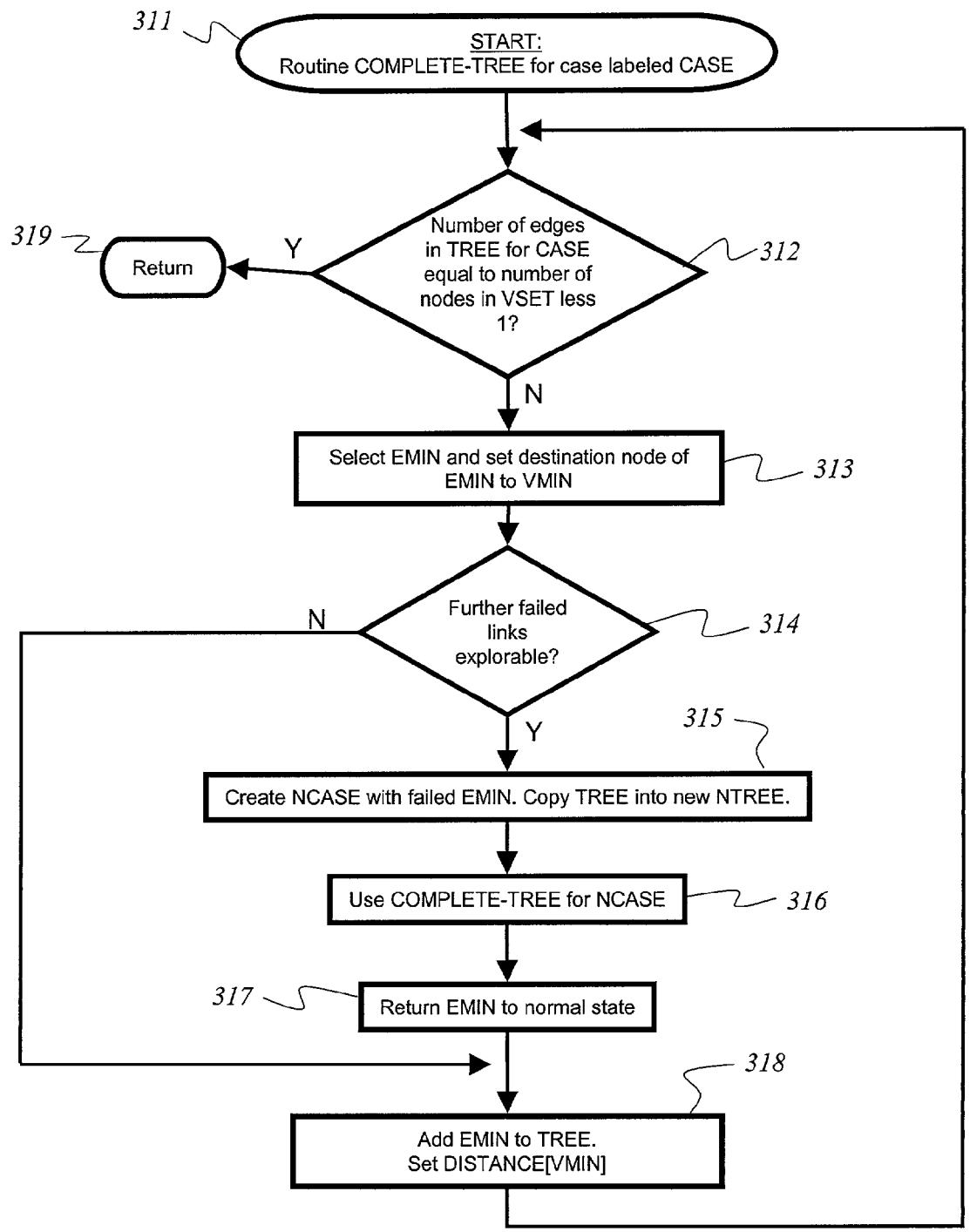
FIG. 3.b

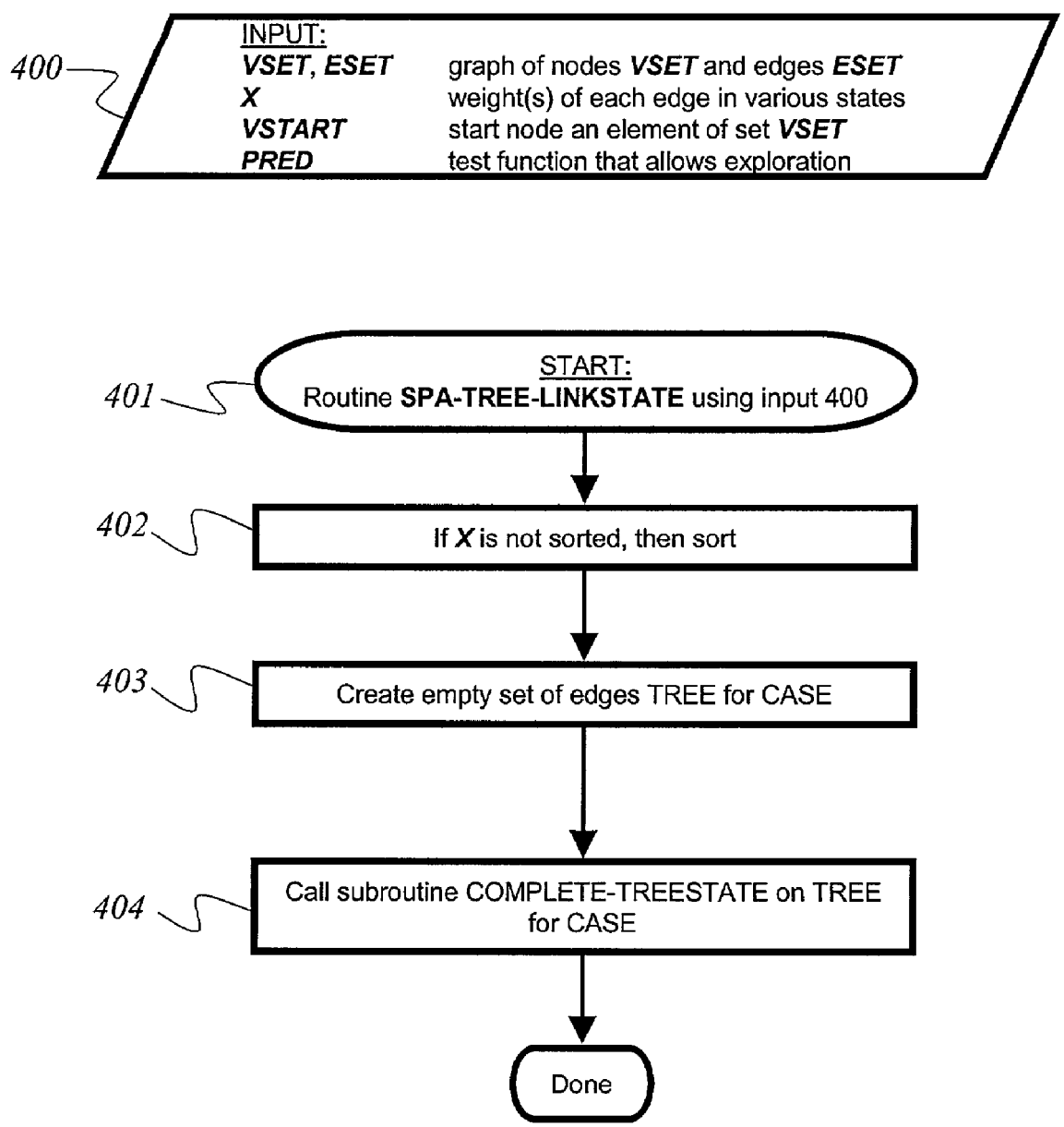
FIG. 4.a

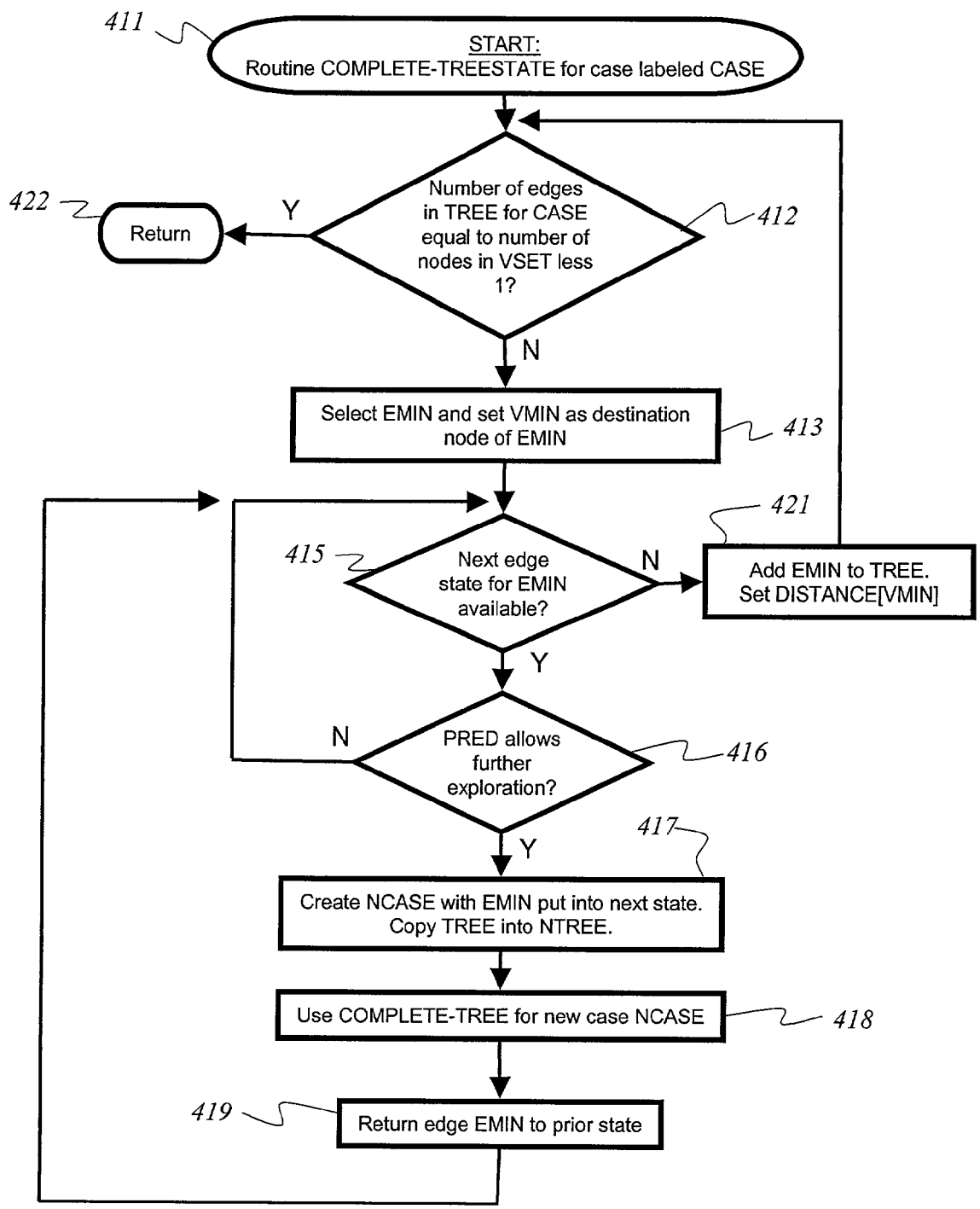
FIG. 4.b

METHOD AND SYSTEM FOR FAST COMPUTATION OF ROUTES UNDER MULTIPLE NETWORK STATES WITH COMMUNICATION CONTINUATION

CROSS REFERENCE TO RELATED APPLICATION

This application claims priority from provisional patent application Ser. No. 60/274,462 filed Mar. 12, 2001, the entire disclosure of which is hereby incorporated by reference.

BACKGROUND

Communication networks typically include stations, known as nodes, connected by links. Nodes may be connected via links on a point-to-point basis, e.g., via serial lines or via a shared media of some type, e.g., Ethernet, shared radio or cellular channels. Data is transmitted from node to node across the links via paths as determined by the routing mechanism. Routing and can be done at a central location or distributed to a number of locations in the network.

Shortest path algorithms (SPA) are a well-known technique for determining the most efficient communication routes. For example, Dijkstra's shortest path algorithm is used in OSPF-2 and the Bellman-Ford algorithm is used in the BGP-4 routing technique and in a quality-of-service (QoS) routing method (U.S. Pat. No. 5,233,604). In distributed routing approaches, nodes that participate in routing are called 'routers', but this does not preclude that node from also acting as a messaging source or destination. In many cases, routing is distributed so that each node determines the next hop for a transmission based on the destination address. Several extensions to this basic operation are known, including: a priori selection of a routing path based on a requested QoS level (U.S. Pat. No. 6,134,589); per packet routing based on a QoS specification contained within the packet (U.S. Pat. No. 6,091,709); routing based on source address as well as destination (U.S. Pat. No. 6,091,725); use of information within the packet, rather than the destination address, to access distinct secondary routing tables/information (U.S. Pat. No. 5,353,283); admission control or incoming rate control of messaging requests to avoid network congestion (U.S. Pat. Nos. 5,367,523, 5,400,329, 6,038,216) (sometimes using 'back-pressure' or 'reverse-flow' techniques); routing based on geographical, rather than network topological, features (U.S. Pat. Nos. 4,939,726, 6,130,890); centralized control and distribution of routing information (U.S. Pat. No. 5,987,521); QoS bandwidth guarantees under a single link failure using a backup route; as well as others.

Although most routing techniques determine a communication path based on the optimization of some metric (network specification such as the number of nodes [hops] visited along the route, delay, cost, etc.), QoS-oriented methods are geared towards techniques for finding and maintaining routes so that one or more metrics are kept to a minimum along a complete end-to-end path (such as bandwidth, jitter, delay, etc.).

Normal routing usually considers additive properties of some metric (like number of hops, link delay, cost) to find shortest routes. While the latter often uses a form of shortest path algorithm, the algorithms used in QoS problems are sometimes called 'restricted' or 'constrained' shortest path methods or use flow-based techniques. The term 'flow' arises as one can view the packets transmitted within the network in association with a communication session from point to point as a 'flow'. Problems associated with the QoS routing of multiple simultaneous network flows where each is categorized as belonging to some class are sometimes referred to as 'multi-commodity flow' problems. For example, each TCP session might be considered a flow and each might have an assigned classification or level of expected service.

A variety of techniques are available to determine the necessary metrics for proper routing. The term 'link-state' is commonly used to refer to the status of any number of possible metrics (such as packet loss rate, bandwidth, latency, cost of use, current utilization rate, etc.) of the direct interconnections between or among nodes. Alternatively, nodes may share/exchange routing table information (e.g. assigned metrics, number of hops, etc.) regarding the reachability (availability) of other nodes known to them. In order for overall network routing to occur, the inter-node (e.g., router) sharing of link states or reachability on a periodic basis or when a significant change in network status occurs is used. Such messages are usually called 'route-updates' or 'link-state advertisements.' Some extensions or alternative approaches have been proposed, including: explicit centralized control of link-state testing at each remote router (U.S. Pat. No. 5,881,051); congestion or packet loss detection with report to source (U.S. Pat. No. 5,090,011); use of time stamps on one-way or round-trip packet traffic for delay measurement (U.S. Pat. No. 5,563,875); as well as others.

Routing techniques mostly based on link-state exchange (e.g., U.S. Pat. No. 4,644,532) are often referred to as link-state methods while those that exchange routing tables are often called distance-vector methods. In either case, the process of achieving agreed upon routing such that all routers in the network use the latest information is called 'convergence.' As discussed above, convergence may be reached via the periodic or asynchronous exchange of link-state, distance-vector or other routing information among network routers. The state of network convergence may be disturbed by resource (e.g. communication links or computer hardware/software) failures, bringing a new resource into the network, dropping a resource from the network, or other changes of system state.

Prior to convergence, or between periods of convergence, a condition of misdirection or 'routing loops' may exist since some network components may not have accurate network state information. Even when operating under convergence 'as normal', network routes may not be using optimal paths for data transfers. For example, a recent study of the Internet has found that significantly better routing existed for 10–60% of end-to-end routes examined.

The prime objective of communication networks, such as the Internet, is delivery of data despite various network resources becoming intermittently overloaded or unavailable. Recent measurements show that fast wide-area routing convergence remains elusive for a variety of reasons; as has been shown, broad network convergence after a link or node failure (versus their return to service) may require from tens of seconds to tens of minutes. Furthermore links or nodes may become sporadically overloaded or congested in such 'best-effort' networks. Obviously, such behavior has a severely detrimental effect on both on-going as well as any attempted newly-initiated communications.

SUMMARY OF THE INVENTION

A method of computing routes on a network is provided. The network is composed of a plurality of nodes and a plurality of edges, representing network links, wherein each edge can be in a plurality of states, and each has an edge metric value in each of its states. The method comprises generating a plurality of shortest path trees from a start node of the plurality of nodes. Each shortest path tree includes a subset of nodes from the plurality of nodes, a set of distance values, and subset of edges from the plurality of edges. Each distance value corresponds to a node of the set of nodes. The subset of edges of the plurality of edges have corresponding edge metric values that makes up a shortest path between the start node and each other node of the subset of nodes. As used herein, VSET is the subset of nodes that are currently included in the shortest path tree and ESET is the subset of edges that are currently in the shortest path tree.

The method generates the shortest path trees as follows. The method sets each edge of the plurality of edges to a state of the plurality of states for said each edge having a lowest edge metric value for said each edge, initiates a current routing scenario(CASE N), and creates a shortest path tree (TREE N) for the current routing scenario (CASE N), wherein TREE N includes a start node at a distance value of zero. The method then (a) fills the TREE N, by performing the following steps:

If the shortest path tree of CASE N is not complete, the method (1) selects an edge (EMIN) having a minimum edge metric value from any node, Vx, in VSET to a node VMIN, wherein edge EMIN and node VMIN are not in TREE, Vx is in VSET, and EMIN is not in ESET. If additional higher-valued states are available for EMIN or if further edge exploration is allowed the method places EMIN into its next higher valued state; creates a new routing scenario CASE N* with EMIN in said higher valued state, copies TREE N into TREE N*, and recursively returns to (a) above, wherein TREE N is TREE N*. If additional higher-valued states are not available for EMIN or if further edge exploration is not allowed then the method adds VMIN to VSET and adds EMIN to ESET in TREE N, defines the distance to node VMIN in TREE N as the sum of the edge metric value of EMIN and the distance value of Vx, and proceeds to (1) above.

If the shortest path tree is complete, then the method ends CASE N, returns the edge metric value of EMIN in TREE N to its prior state and proceeds to (a) above for prior CASE N, unless there is no prior CASE N (e.g., CASE N=CASE 1), in which case the method ends.

BRIEF DESCRIPTION OF DRAWINGS

FIG. 3a depicts a flowchart for the network route computation method according to an embodiment of the present invention.

FIG. 3b depicts a flowchart for the recursive part of the algorithm in FIG. 3a.

FIG. 4a depicts a flowchart for a more generalized version of the algorithm in FIG. 3a.

FIG. 4b depicts a flowchart for the recursive part of the algorithm of FIG. 4a.

DETAILED DESCRIPTION

Figure 1:
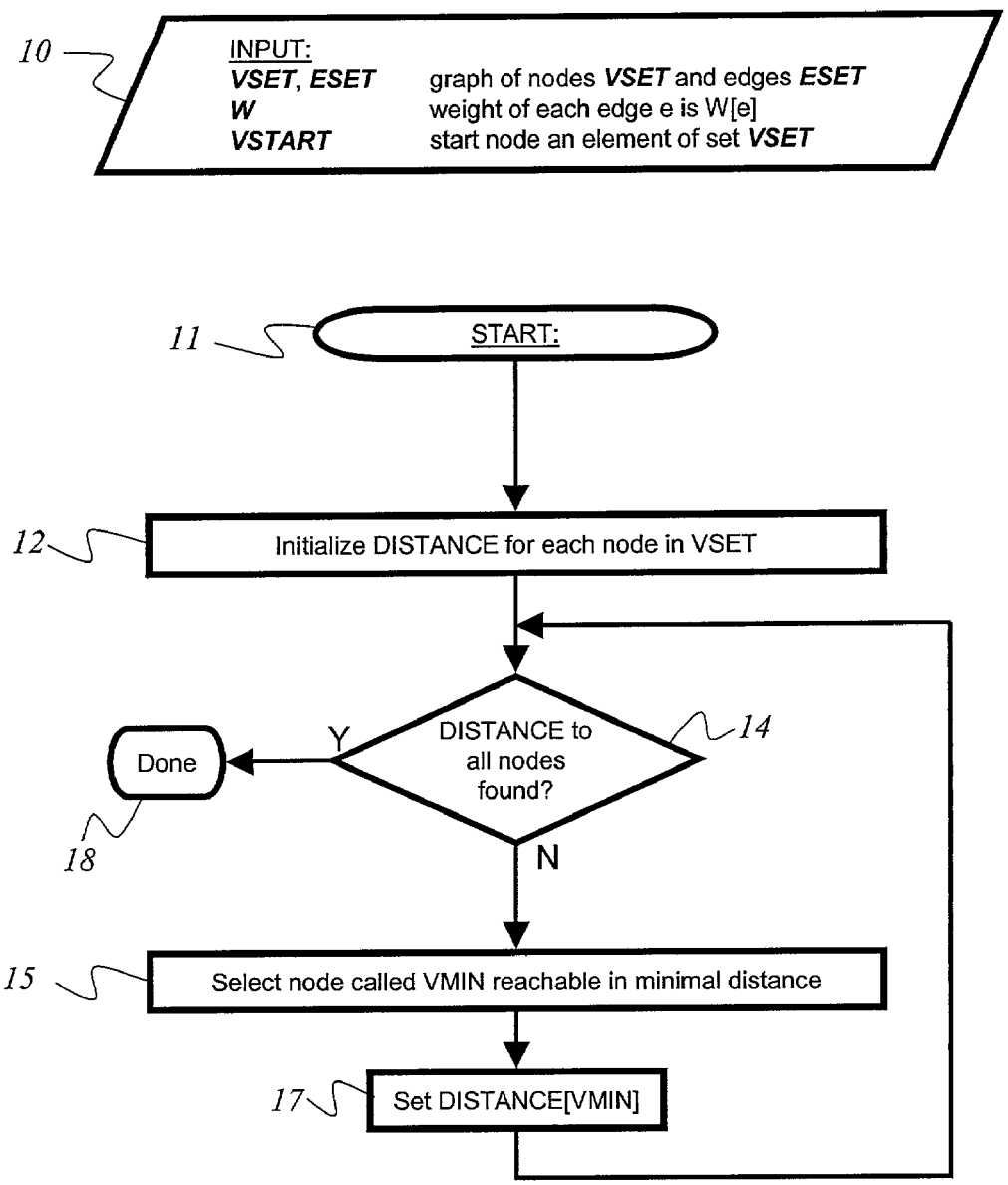
FIG. 1 depicts a flowchart for the prior art Dijkstra algorithm.

A routing system and computation method according to an embodiment of the present invention avoids convergence delays and intermittent congestion by generating and implementing optimal routes for rerouting data as needed. Route computation is optimized in that it only considers link states that actually impact the resulting optimal routes, or shortes path trees. Many link types or network status indicators and state information exchange could be used, including error return packet (e.g. ICMP or Internet Control Message Protocol message), explicit or separate network monitoring, internal server knowledge of TCP rate adaptation, lengthy delays in receipt of acknowledgements, periodic or asynchronous exchange messages and use of time-stamps for link-state information, for example.

Typically, routing includes: (1) the use of metrics or reachability (ability to reach a certain node) of various types; (2) exchange of metrics or reachability among the nodes; (3) an algorithm or method for computing routes based on the given metrics; and (4) storage and updating of routing information. A system in accordance with the present invention deals primarily with areas (2) and (3) for the special cases where failures (or other varied per edge or per node metric) must be accounted for. Normally, prior to route convergence, the network is unreliable for proper data delivery since one or more network routers may not have received the proper update messages or otherwise be aware of the true, current network state. The present invention provides routing via intermediate points over the network even when it a non-converged state. The disclosed intermediate routing technique can be implemented over a network such as the Internet by transmitting the message from source to destination via the intermediate points by taking advantage of multi-state routing knowledge. Another possibility for deployment is the use of source routing (where the packet route is defined at the source).

The system and method generates optimally efficient routes by considering multiple operating states of the network components (links or nodes). By implementing the generated routes and re-routing data, uninterrupted communication is available during periods of congestion or network route non-convergence. The multiple operating states considered may represent components that are fully functioning, completely failed, or partially failed. Preferably, each state is represented by a corresponding numerical value for a metric associated with a link. For example, a finite value might represent the normal case and 'infinity' (or other large value) may represent the failed case. In general, any set of states and corresponding number schemes may be used.

The present invention provides two advantages over the prior art approach of using a shortest path algorithm: (1) multiple routes in the form of shortest path tress are only computed for combinations of metrics that actually have impact, and (2) the dynamic programming aspect further optimizes route computations by re-using computed routes to avoid unnecessary repeated work. Although the combined use of both techniques provides the most benefit, each can be used separately as well.

The present invention may apply to networks with any mixture of simplex or duplex links. For the sake of simplicity, the algorithms discussed herein are explained as they apply to simplex communications, represented by a directional edge in the associated graph. Those skilled in the art, however, will recognize that duplex links can be represented as two edges with the same metrics between the nodes and that only minor changes are needed to accommodate the inherent relation that exists between link pairs. For example, when a full duplex physical link fails, then the two directed edges in the graph representation also fail.

Figure 2:
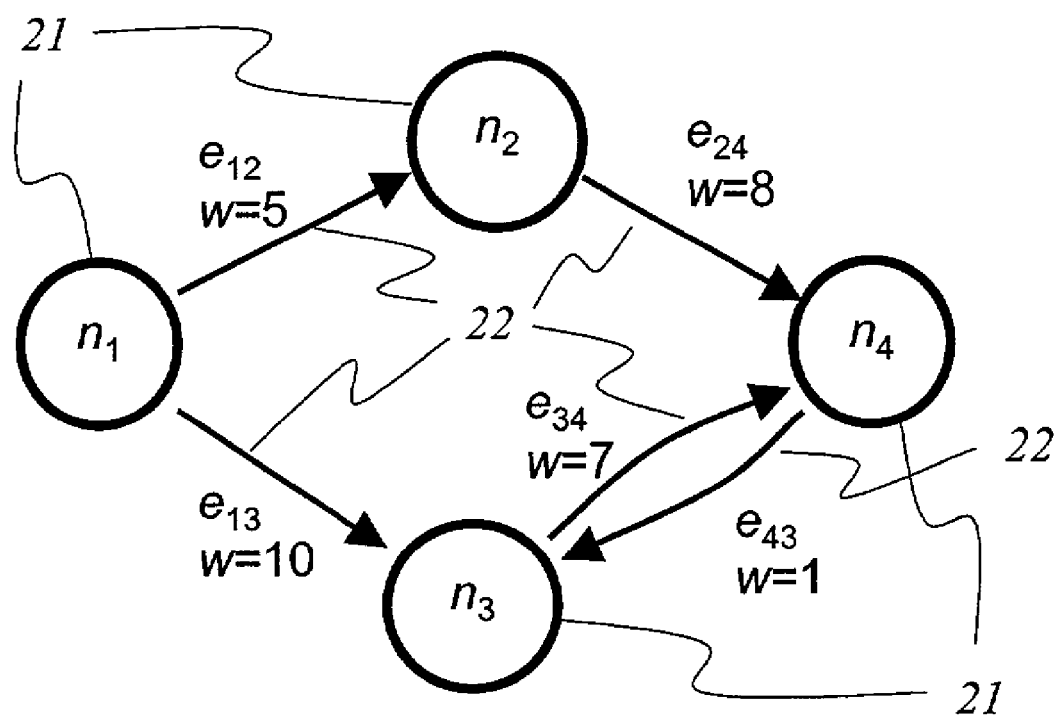
FIG. 2 depicts an example communications network.

In the prior art algorithm shown in FIG. 1, the input 10 includes a graph composed of a set of nodes (VSET) and a set of directional edges (ESET). Each edge has a metric associated with it (W). The algorithm computes the shortest path to each node in VSET from a starting node called VSTART. The shortest path is the one with the smallest cumulative weight, i.e., sum of the metric W of each edge in the path. Starting with this information (step 11), the algorithm first initializes a value, DISTANCE, for each node, except the VSTART node, to infinity. The DISTANCE of the VSTART node is set to zero. The algorithm then checks whether the distance to all the nodes in the VSET have been found (step 14). If they have not, a node is selected from the set of nodes (VSET) and called VMIN (step 15). VMIN is selected from the nodes that are reachable from the edges in ESET. Of the reachable nodes, the one with a known distance and the smallest metric value (smallest W) is chosen to be VMIN (step 17). The algorithm returns to checking whether all the nodes have been found (step 14). If there are any nodes left that have not been checked, steps 15 and 17 are repeated until all nodes have been checked. Once all the nodes in VSET have been checked (step 14), the algorithm terminates. FIG. 2 depicts a simple network with nodes 21 and links 22. The links 22 each have an edge metric value, w. Application of the DIJKSTRA algorithm in FIG. 1 to the network of FIG. 2 will be understood by those skilled in the art. In the case where the source node is $n_1$ the resulting shortest path tree is composed of links, $e_{12}$, $e_{13}$ and $e_{24}$. In this case nodes $n_1$, $n_2$, $n_3$, and $n_4$ are reachable from $n_1$ with path metrics, 0, 5, 10, and 13 respectively; these would be the resultant values for d for each node after applying for the algorithm of FIG. 1. For example, the shortest path from $n_1$ to $n_4$ is by first traversing $e_{12}$ and then $e_{24}$ because the sum of the metrics along the path is 13 (w=5 and w=8), which is less than 17, the sum of the metrics along the path from $n_1$ to $n_3$ (w=10), and $n_3$ to $n_4$ (w=7). In general, SPA algorithms find trees with the shortest additive value of link metrics from a particular node to every other node. In addition to additive link properties, the same methods may be used to handle multiplicative properties as well. Further, several variations of the algorithm are well known, for example it may be modified to find maximum valued paths.

FIG. 3 is a flowchart for an algorithm according to an embodiment of the present invention that computes shortest path trees in a network with any combination of up to, and including, a certain number (KMAX) of simultaneous link failures. In other words, if the certain number of simultaneous link failures is ten (KMAX=10), the algorithm determines the shortest path trees for one simultaneous link failure, two simultaneous link failures, three simultaneous link failures, and so on, up to ten simultaneous link failures.

The input 300 includes a set of nodes (VSET), a set of edges (ESET) with their respective weights (W), a starting node (VSTART), and the number of simultaneous link failures to consider (KMAX). Based on the input 300, the shortest distance to each node from the starting node (VSTART) and the multiple trees and DISTANCEs for each simultaneous link failure. The TREE for the non-failed (no simultaneous link failures) state, called CASE, is initialized to empty with its associated DISTANCE values (step 302). A subroutine COMPLETE-TREE is called (step 303) to determine the shortest path tree (TREE) and distance to each node (DISTANCE) for the situation where there are no simultaneous link failures (CASE). The subroutine also determines TREE and DISTANCE for each simultaneous failed link state scenario having up to and including, KMAX simultaneous failures.

FIG. 3b is a flowchart for the COMPLETE TREE subroutine of FIG. 3a. The sub-routine starts execution (step 311) and determines if the number of edges in TREE for CASE (with no simultaneous link failures) is equal to the number of nodes in VSET minus 1 (step 312). The reason for doing so is to check if all edges belonging to the shortest path tree for CASE have been found. Shortest path routes are trees where each edge adds one new node to the tree. Thus, a shortest path tree for a connected graph has a number of edges equal to the number of nodes minus 1. It follows that if the number of edges in TREE is equal to the number of nodes in VSET minus 1, then the complete shortest path tree has been found. Next, a link EMIN is selected (step 313) in the shortest path tree (TREE) for case. EMIN should connect with a node that has not yet been reached and whose distance would yield the minimum total DISTANCE (edge weight plus DISTANCE of the connecting node) accumulated so far (step 313). Once EMIN is selected, its destination node is selected as VMIN (step 313). The algorithm checks to see if all the cases up to KMAX have been examined by comparing the number of failures in the current CASE (current routing scenario) against KMAX (step 314). If the number of cases examined is less than KMAX, it indicates there are more simultaneous link failure cases to examine. If not, the procedure adds EMIN to TREE and the new VMIN to DISTANCE (step 318).

If the test of KMAX against the number of edge failures in the current case indicates that there are more cases to examine (step 314), NCASE is created where EMIN is failed (step 315). TREE is then copied to NTREE (step 315). By copying TREE, the routes computed for that case are being re-used in accordance with dynamic programming under an embodiment of the present invention. The routine COMPLETE-TREE is called recursively (step 316) to find the shortest path tree for the new case. At completion, the edge EMIN is returned to its normal state (step 317) and the process continues (step 318). It should be noted that the consideration of the failure of edge EMIN is significant in that this edge is part of the shortest path tree for the current case.

To demonstrate the algorithm of FIGS. 3a and 3b, consider its application to the network in FIG. 2 where the start node VSTART is $n_1$ and KMAX is 1 (no more than 1 edge failure at a time is considered). At step 302, the method will create an empty tree for the case of all unfailed edges and set the value of DISTANCE for node $n_1$ to 0 and to infinity for all other nodes for this case. The sub-routine COMPLETE- TREE is called (step 303) where CASE represents the unfailed edge case. Referring now to FIG. 3b, since the number of edges in TREE is zero at step 312, the process continues to step 313. EMIN is $e_{12}$ and VMIN is node $n_2$ because the weight of edge $e_{12}$ (5) is less than the weight of edge $e_{13}$ (10). Since node $n_2$ is the destination node of edge $e_{12}$, VMIN is node $n_2$. Since only 1 edge failure is allowed and the current case has none, the test at step 314 will continue to step 315. A new case called NCASE is created where edge $e_{12}$ is indicated to be in a failed condition and the current TREE (still empty at this point) is copied to NTREE. The procedure then calls itself (step 316) for the new NCASE.

In the recursively called copy of the COMPLETE-TREE procedure, what was NCASE and NTREE are now TREE and CASE. The check of step 312 fails again so EMIN is $e_{13}$ and VMIN is $n_3$ (step 313). Since there is already a failed link in the case being considered, the test at step 314 now fails going to step 318 which adds $e_{13}$ to the tree and sets DISTANCE[$n_3$] to 10. Another loop of steps 312, 313 and 318 follows—with the test at step 314 failing each time—which adds edge $e_{34}$ to the current tree and sets DISTANCE[$n_4$] to 17. Even though the number of edges in the tree is 2, there are no further edges that can be selected and the process ends without being able to reach all the nodes (node $n_2$ is not reachable from $n_1$ when edge $e_{12}$ has failed).

After the recursively called copy of COMPLETE-TREE finishes, the algorithm returns to the earlier call to COMPLETE-TREE at step 316 where the shortest path tree (with edges $e_{13}$ and $e_{34}$) for the case of edge $e_{12}$ failure completed. Edge $e_{12}$ is restored to its normal state (step 317) with metric 5. At step 318 $e_{12}$ is added to the tree (now the unfailed case) and DISTANCE[$n_2$] is set to 5. Upon returning to step 312, the tree is determined to be incomplete as the number of edges is 1 and not 3 (one less than four, the number of nodes), so another edge, $e_{13}$ is selected (step 313). Since the algorithm is back to the unfailed case, the test at step 314 continues to step 315. The current tree with edge $e_{12}$ is copied to NTREE, edge $e_{13}$ is put in a failed state and another recursive call is performed (step 316). The recursive call will result in returning to step 316 with a new shortest path tree for the case where edge $e_{13}$ has failed. The SPT is composed of edges $e_{12}$ (already part of the tree when COMPLETE-TREE started for this case), edge $e_{24}$ and edge $e_{43}$ with DISTANCE[$n_2$] equal to 5, DISTANCE[$n_4$] equal to 13 and DISTANCE[$n_3$] equal to 14.

After this recursive exploration, the process again returns to step 316 and returns $e_{13}$ to its normal state (317). This edge is added to the unfailed tree case at step 318 and sets DISTANCE[$n_3$] to 10. The next edge selected at step 313 (for unfailed case) will be edge $e_{24}$. The recursive exploration of the failure of this edge will result in a tree composed of edges $e_{12}$ and $e_{13}$ (both already part of the tree when COMPLETE-TREE started for this case) and edge $e_{34}$ with DISTANCE[$n_2$] equal to 5, DISTANCE[$n_4$] equal to 17 and DISTANCE[$n_3$] equal to 10. At the return of this exploration to step 316, the edge $e_{24}$ is returned to its normal state and it is added to the unfailed case tree and DISTANCE[$n_4$] set to 13. At step 312, the tree is detected as being complete so the process is complete as well. All shortest path trees where no more than 1 (including 0, the unfailed cased) simultaneous edge/link failures have been found for failures that are significant edge failures that did not impact shortest paths (in this case the failure of edges $e_{34}$ and $e_{43}$, were not considered by application of step 312). Dynamic programming is responsible for copying the partially discovered information (the copy of the trees and respective distances) into a new case, thereby saving computational effort. The four shortest path trees found are then summarized in Table 1.

TABLE 1

Shortest Path Trees

| CASE | Edges | DISTANCE (note DISTANCE[$n_1$] = 0 for all cases) |
|---|---|---|
| $e_{12}$ failed | $e_{13}$, $e_{24}$ | DISTANCE[$n_2$] = infinity/not reachable, DISTANCE[$n_3$] = 10, DISTANCE[$n_4$] = 17 |
| $e_{13}$ failed | $e_{12}$, $e_{24}$, $e_{43}$ | DISTANCE[$n_2$] = 5, DISTANCE[$n_3$] = 18, DISTANCE[$n_4$] = 13 |
| $e_{24}$ failed | $e_{12}$, $e_{13}$, $e_{34}$ | DISTANCE[$n_2$] = 5, DISTANCE[$n_3$] = 10, DISTANCE[$n_4$] = 17 |
| unfailed | $e_{12}$, $e_{13}$, $e_{24}$ | DISTANCE[$n_2$] = 5, DISTANCE[$n_3$] = 10, DISTANCE[$n_4$] = 13 |

FIG. 4 generalizes the algorithm of FIG. 3 by allowing edge metrics to be composed of a given set of values X (rather than a single value and a 'failed' state), and by using a generalized function PRED to control network state exploration (rather than the simpler case based on KMAX failures). The method starts (step 401) with input 400. If the value of X for each edge is not provided in ascending sorted order, then they are sorted on a per edge basis (step 402). A base case, CASE, is created with all edges at their lowest edge metric value and an empty TREE (step 403). The sub-routine COMPLETE-TREESTATE is called to compute the shortest path trees for various edge state combinations as allowed by PRED (a function which controls network state exploration) (step 404).

The function PRED allows for precise recursion control. For example, in a limited memory storage situation, the PRED function could be designed to return false whenever the fixed memory capacity allowed would be exceeded. In another case, it could be designed to allow exploration of only particular combinations of failures (this function can have its own retained state). Also, instead of 'filtering' cases as screened by the predicate, the algorithm could be modified to use a 'network state generator' as long as care is taken to ensure that cases are considered in order of increasing metrics for each link state.

A flowchart for the sub-routine COMPLETE-TREESTATE is shown in FIG. 4b. It begins (step 411) by accepting its input/parameters for a particular case (CASE) and its associated TREE. The current tree is evaluated to determine whether it's completely finished (step 412) by comparing the number of edges in TREE to the number of nodes in VSET. If TREE is incomplete, an edge is selected that adds a node to the tree with a minimum DISTANCE (step 413) and it is determined whether another edge metric state for EMIN is available (step 415). This comes from X (weight of each edge metric in various states) of the input 10. Since the weights are in sorted order, the metric value, if available, will be higher than the current edge metric value. If no such state is available, EMIN is added to TREE and the distance to the target node is set (step 421). The algorithm then returns to see if testing is complete (step 412). If another edge metric state is available (step 415) and application of PRED allows for further exploration of edge metric states (step 416), the process continues by creating a new case NCASE with EMIN put into this next state (step 417). TREE is copied to NTREE, CASE is copied to NCASE, and NTREE is used in the recursive call to COMPLETE-TREESTATE (step 418). Following its return, the edge is placed back into its prior state 419 and the process continues at step 415 by checking for the next state possibility for EMIN. It should be noted that where EMIN has three possible edge metric values, that the check in step 415 does not repeat over the same values. The meaning of 'next state' at steps 415 and 417 imply that the first, second and then third are checked each time.

Figure 5:
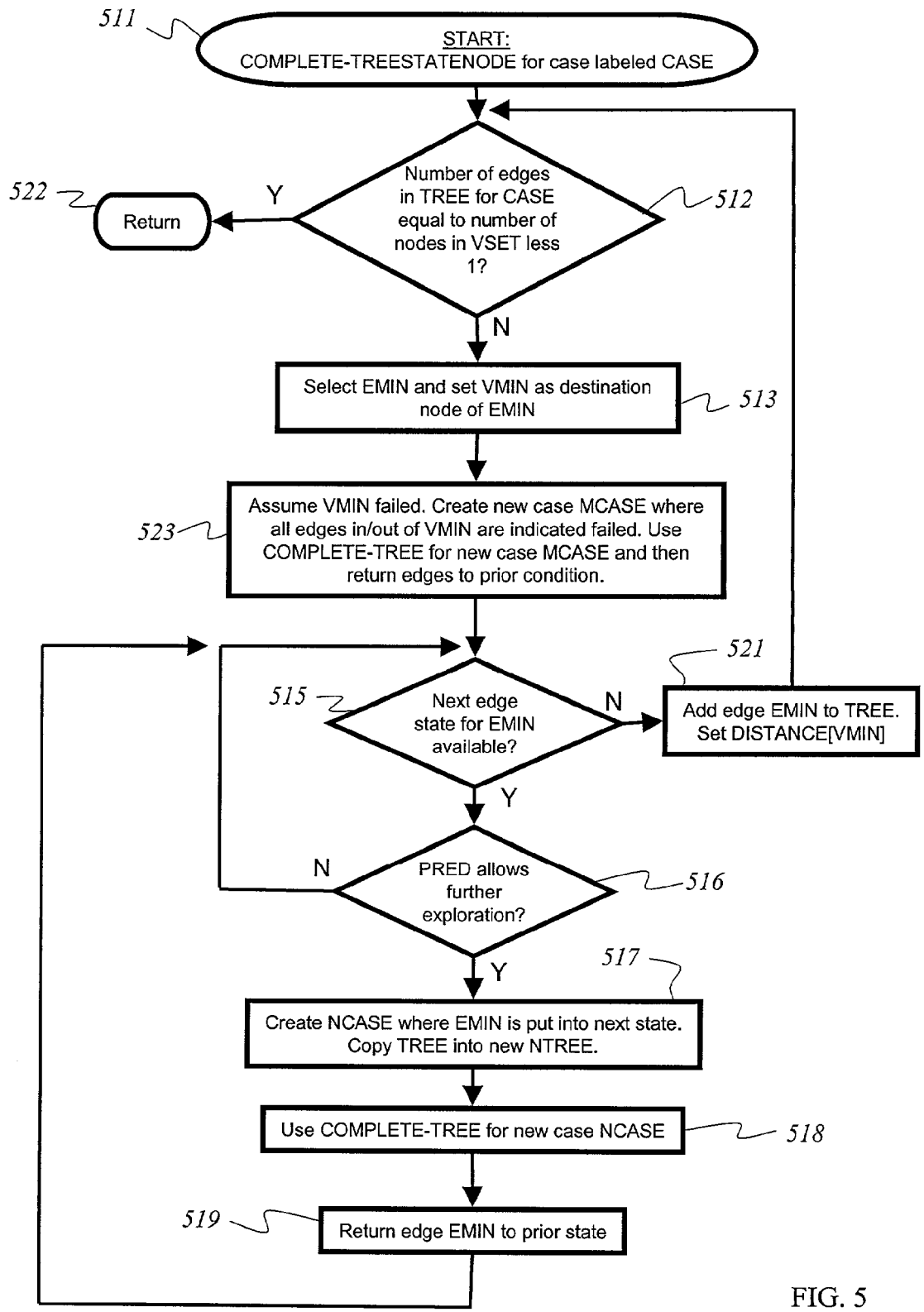
FIG. 5 depicts a flowchart for a more generalized version of the algorithm in FIG. 4b that considers node failures.

In accordance with another embodiment of the present invention, FIG. 5 shows an extension, COMPLETE-TREESTATENODE that considers multiple node failures in addition to multiple link failures. The routine follows the same processes as that of FIG. 4.b, with the only addition being step 523. At step 523, the node that is next being considered for addition to the TREE, VMIN, is assumed to have failed. Failure is considered in terms of making all incoming and outgoing edges to and from VMIN as failed. The process here creates a new case for this situation places all such edges into failed state, copies the current TREE, uses COMPLETE-TREE STATE NODE (recursively) to investigate the case and then returns the edge metrics to their prior state.

To illustrate the application algorithm of FIG. 4 to a network, consider the example given above for the application of the COMPLETE-TREE algorithm in FIG. 3 to the network of FIG. 2. If the states for each edge provided to the method of FIG. 4 were metrics composed as a single nominal or unfailed case and a completely failed edge (with an implied metric of infinity as was assumed in FIG. 3), then the application of the method of FIG. 4 would follow in much the same manner and generate the same result. The difference here is that now each edge has multiple possible metrics (instead of a nominal and infinity), so each metric is explored using the logic and control of steps 415 and 416. A similar statement can be made about the further expanded technique of FIG. 5. Here, in addition to multiple edge metrics, node failure is also considered by assuming that all edges in and out of a failed node are failed.

As one reasonably skilled in the art would recognize, a variety of configurations are possible within the scope of the present invention disclosed herein. For example, each node can run the algorithm with itself as the source node (as s in the algorithms) only or each node may use the technique to compute routes from itself as well as any other of all other nodes. Rather than distribute the computation, a particular node could perform all route computations and distribute them to their respective nodes.

Furthermore, use of various advanced or various data structures in these algorithms are possible. The link selection optimization technique disclosed herein explores link states in terms of edge metrics only as they will actually impact resultant shortest path trees in various states. This is achieved in the algorithmic implementations presented in FIGS. 3, 4 and 5, by recursively exploring higher metrics for edges that are to be selected for the current shortest path tree. Dynamic programming techniques are used in conjunction with this method to further aid in the efficiency. However, other implementations that employ these disclosures are possible and the scope of the patent includes these as well.

As the shortest path tree may not be unique, an implementation that uses the disclosed techniques to compute and store all shortest path trees or a subset of all shortest path trees, rather than one, is also included in this patent. Those skilled in the art will recognize that this can be readily accomplished by allowing the FIND-MIN-EDGE routine to provide all minimum cost edges rather than one along with suitable modifications to allow each such independent possible selection to be stored in a separate tree.

During periods between network convergence, some routers may not have recent, accurate updates reflecting the new network state and hence routing is adversely affected. To illustrate the problem, consider the network in FIG. 6 composed of nodes 61 and links (edges) 62 and assume that it is currently in a converged state using the edge metrics shown. Further assume that there is traffic flowing from node $n_1$ to $n_6$. To traverse the shortest path, this traffic will flow as: $n_1$ to $n_3$ to $n_5$ to $n_6$. Now assume that link $e_{56}$ has a 'substantial' rise in metric and that node $n_1$ is informed. Node $n_1$ cannot assume that all other network nodes have reached convergence and are aware of the metric state for $e_{56}$. This creates a problem in ensuring delivery to node $n_6$ if any or all other nodes have not yet received updates concerning the present situation. It is important to realize that the edge metric rise may be due to permanent conditions, temporary conditions (such as a link failure), or intermittent conditions such as link congestion.

In accordance with another embodiment of the present invention, a method for continuation of messaging during link or node failures or congestion is provided. The communication continuation method disclosed is implemented using two functional elements, the first is a means for reacting to and communicating network state changes and the second is a means for determining the best alternate route under such state changes.

Figure 7:
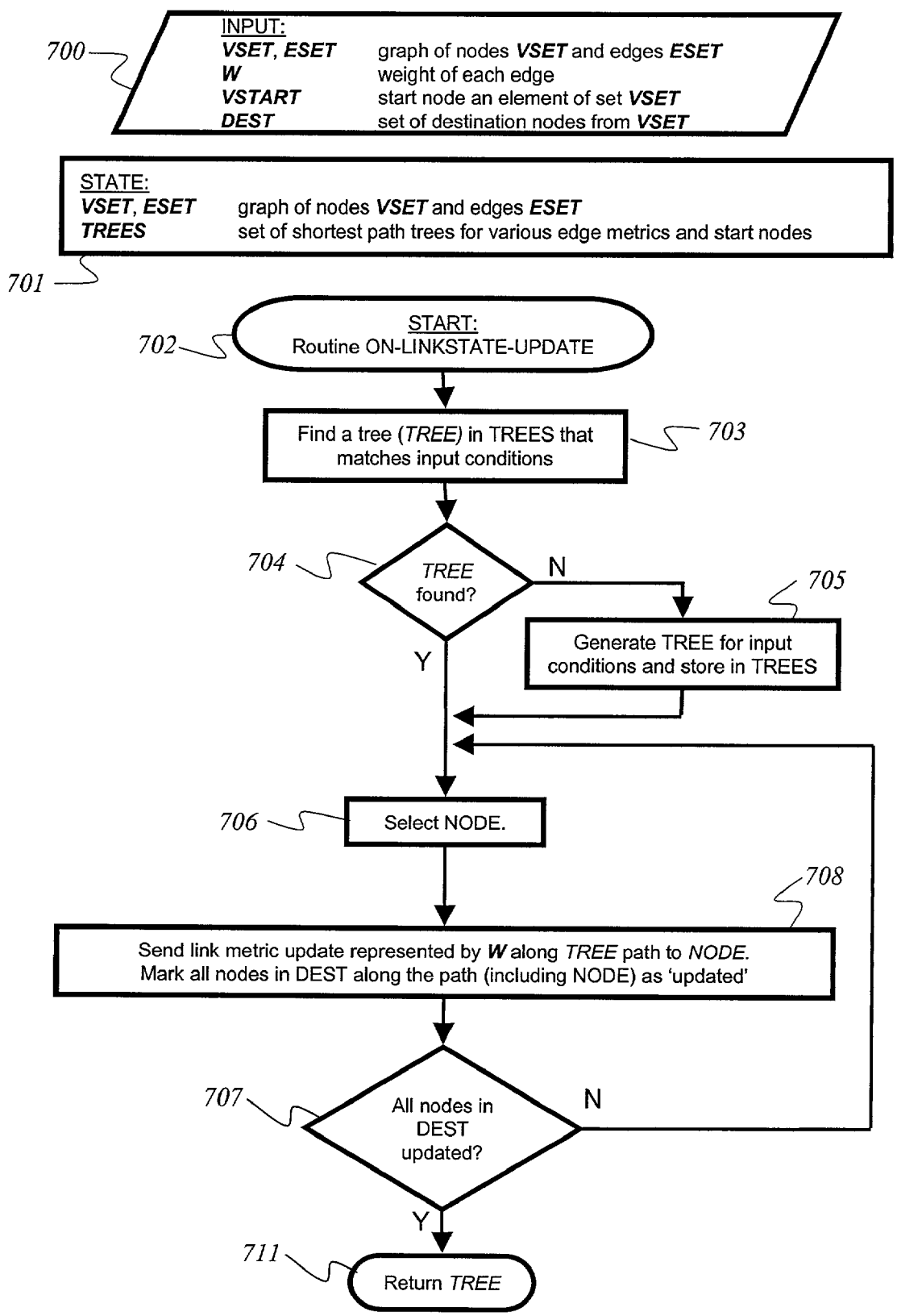
FIG. 7 is a flowchart for an optimized route update technique according to an embodiment of the present invention.

FIG. 7 is a flowchart for yet another embodiment of the present invention that optimizes the distribution of edge metric updates from node VSTART for communications originating at VSTART and ending at a node in DEST. The algorithm can be used to aid propagation of network state as it changes from time to time. Input 700 includes a graph of nodes 701 with VSET and edges ESET, and a set of shortest path trees called TREES that are shortest path trees for the graph from various starting nodes and for various edge metrics (network states). The routine starts 702 with its input 700. The first step 703 checks the TREES database for a shortest path tree that matches the input edge weights W and starting node VSTART. If not found (step 704), then it is created (step 705) or, alternatively, the state of 701 could be eliminated entirely and computed each time (step 705).

Next, a node is selected from the nodes in DEST. The selected node, NODE, should have a path from VSTART that includes most other nodes in DEST. The edge metric state W is then sent from VSTART to DEST at step 708, which is received not only by DEST but by the nodes along the path so that they can be considered 'updated'. If all DEST nodes are updated (step 707), the process ends (step 711) (returning the tree if needed). Otherwise, the process loops back to step 706. The algorithm optimizes the number of update transmittals by sending the updates along paths that include as many of the other destinations as possible first. In this way, on the first update, a maximum number of nodes are reached and updated. Note that it also optimizes metric updates over existing routing update methods in that only those paths from source (VSTART) to any of several destinations (list of nodes DEST) are updated; it is not necessary to inform all nodes in the network of the update and thus a great savings over existing methods may accrue.

Figure 6:
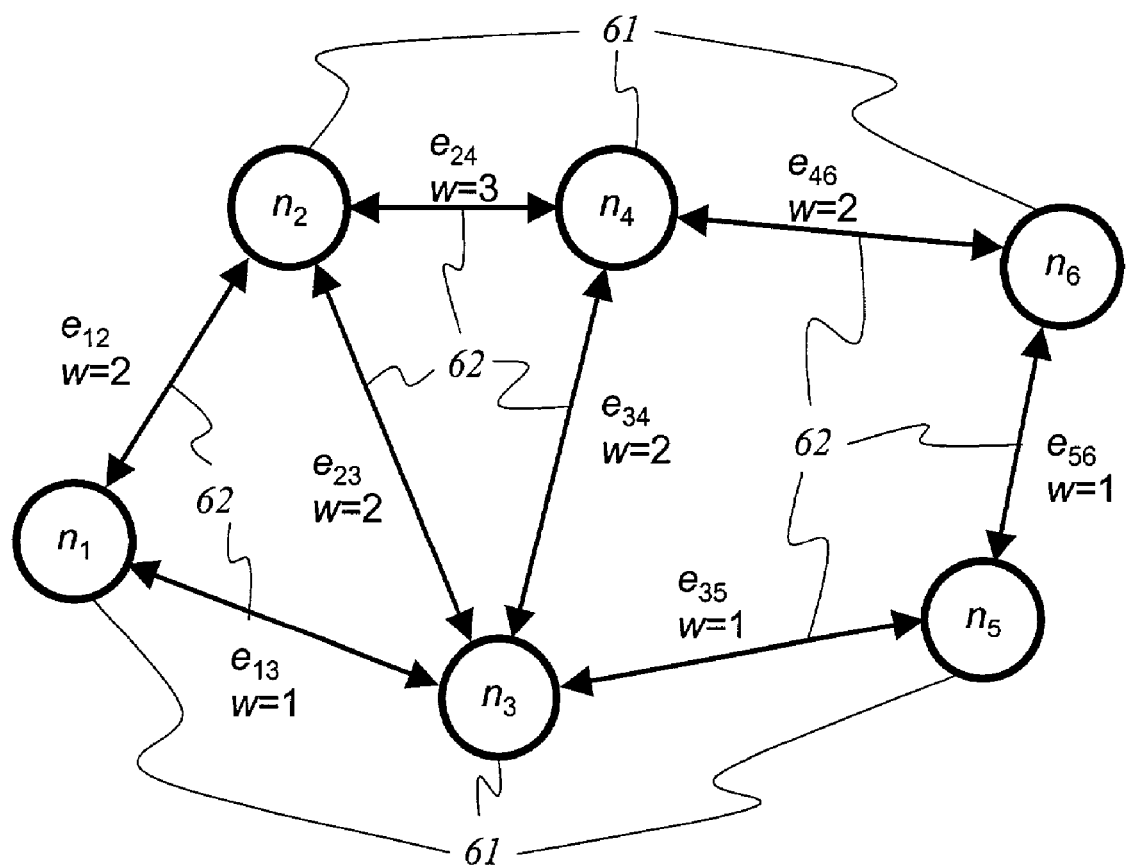
FIG. 6 depicts a more complex exemplary communications network.

Consider the application of the method disclosed in FIG. 7 to the network of FIG. 6. The nodes and edges and edge metrics of FIG. 6 would be contained in the information (700 and 701) as VSET, ESET and W. Assume $n_1$ is VSTART (starting node) and the destinations (DEST) are nodes $n_2$, $n_5$ and $n_6$. In steps 703 to 705 the shortest path tree for these conditions is either looked up in the TREES database or generated. The resulting shortest path tree will be composed of edges $e_{12}$, $e_{13}$, $e_{34}$, $e_{35}$ and $e_{56}$. At step 706, the node $n_6$ will be selected since the route from $n_1$ to $n_6$ contains $n_5$ which contains two nodes in the set DEST. The route from $n_1$ to $n_2$ is direct and hence only has one node from DEST. Thus, $n_6$ will become the variable called NODE at step 706. At step 708, the link update is sent from $n_1$ to $n_6$ thereby informing all nodes along the path, including both $n_5$ and $n_6$, of the new network conditions and each of these is marked as 'updated'. At step 707, node $n_2$ is still not updated and the process loops back to step 706. This time, node $n_2$ is selected as it is the only remaining node not updated in DEST. The update is sent to $n_2$ and it is marked updated. At step 707 all nodes in DEST have been updated and the process ends.

Note that in this case, only two update transmissions were needed to update three nodes (and nodes along the path to these nodes) and that a savings occurred since an update never needed to be sent to $n_4$. Note that traffic routed from n1 to any of the destinations $n_2$, $n_5$ and $n_6$ does not require intermediate forwarding by node $n_4$. Therefore, $n_4$ does not need to be aware of the updated network state (W). For large networks with a few sources and destination sets the savings in update transmittals is substantial.

These edge metric updates can be done as explicit transmissions in advance of traffic flow or piggy-backed on actual traffic along the new shortest path route. Although the number of edge weight updates sent is minimized, the update may in fact be sent to the same neighbor several times. Moreover this update may arrive (multiple times) at a node from several source nodes that each are employing this method.

The algorithm of FIG. 7 assumes that the system is controlling routing. In the case where routing is not under the system's control, the algorithm of FIG. 8 discloses a method to continue communications. In this case, the underlying network uses its own routing tables and its own routing techniques that determine alternate routes and makes use of intermediate nodes for delivery. In practice, it could be deployed on the Internet using techniques such as tunneling, source routing or a method such as IP source routing or Multi-Protocol Label Switching (MPLS).

Figure 8:
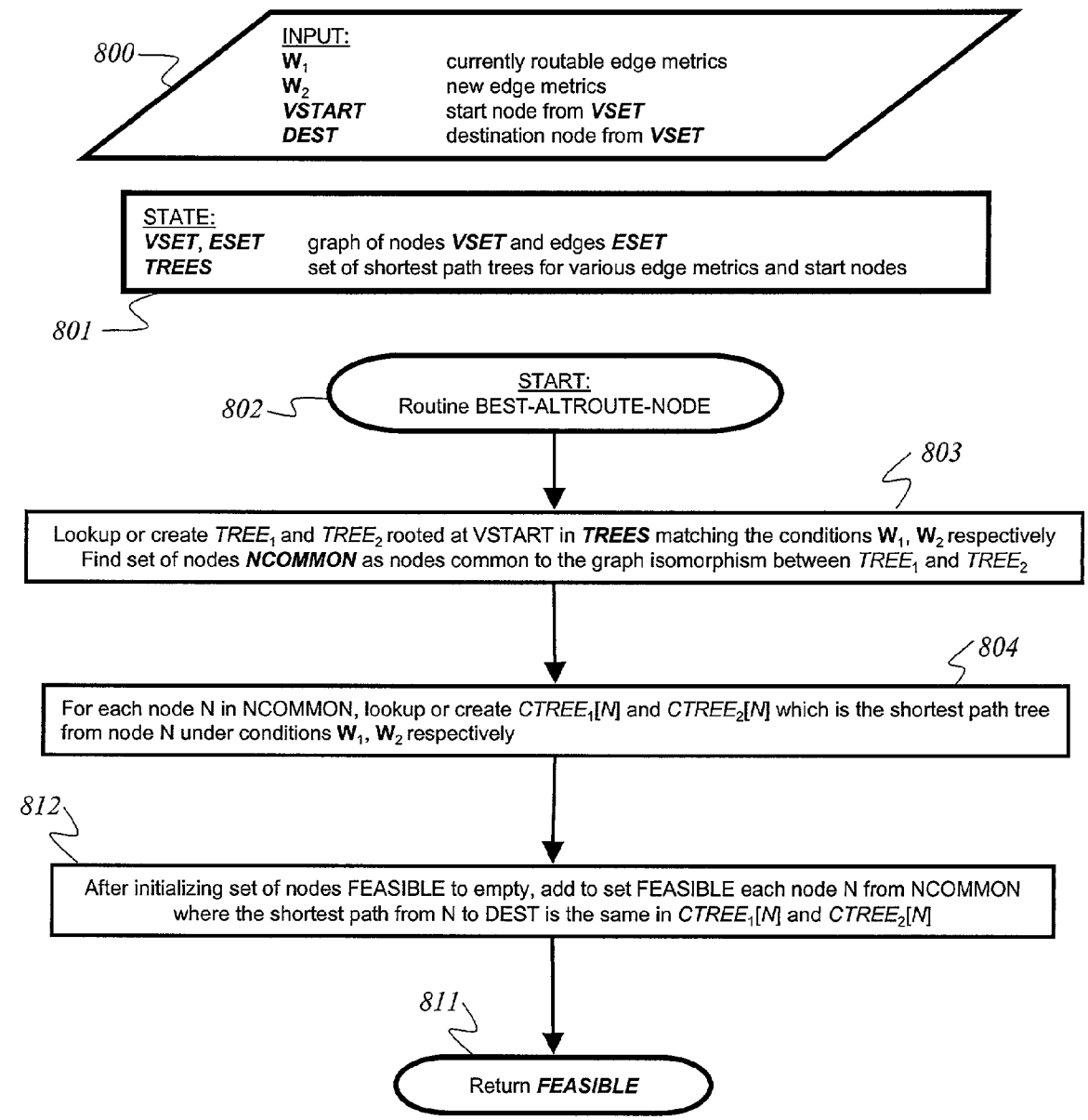
FIG. 8 is a flowchart for the computation of alternative routes according to an embodiment of the present invention.

The algorithm disclosed in FIG. 8 provides a method that allows communications over networks with their own routing technique, even when network state changes occur that are as of yet unknown to the underlying network routing system. The algorithm decides on, and then makes use of, intermediate nodes to assist in communication. As in FIG. 7, the method maintains a state 801 with a graph and a set of shortest path trees. With input 800, there is a single starting node VSTART and destination node DEST (DEST in FIG. 7 is a set or list), information regarding the edge states as routed by the underlying network in $W_1$, and information about an updated or new network state expressed as edge metrics in $W_2$. In effect, the algorithm discovers a set of intermediate nodes, FEASIBLE, where the network provided routing from VSTART to a node in FEASIBLE, and from that node in FEASIBLE to DEST, operates when the network is actually in condition $W_2$ while the network routing is operating under the condition $W_1$.

The algorithm starts by looking up the shortest path trees in the TREES database that correspond to network conditions $W_1$ and $W_2$ or creating them if necessary (step 803). The graph isomorphism between the rooted trees is computed and the set of nodes common to both is stored in NCOMMON. Note that NCOMMON is the set of nodes that are reachable from VSTART under network conditions $W_2$ while the underlying routing system believes that the network is in condition $W_1$. Next, NCOMMON is narrowed down to FEASIBLE by determining reachabilty under each network condition from the nodes in NCOMMON to DEST. To do so requires looking up or creating, as needed, shortest path trees CTREE from each node N in NCOMMON under each network condition (step 804). At step 812, FEASIBLE is initialized (to empty) and the nodes from NCOMMON with a path to DEST that is the same under either condition are added to FEASIBLE which is returned (step 811).

Consider this method as applied to the sample network in FIG. 6, where the source node is $n_1$ (s in the algorithm) and the destination is $n_6$ (d). Assuming the edge metric situation is as depicted, these metrics would be captured as $W_1$ in FIG. 8. Assuming there is an increase to the edge metric for edge $e_{56}$, which would be captured as $W_2$, the algorithm would find that the only feasible node for $n_1$ to $n_6$ traffic is $n_4$, so $n_4$ would become the sole member of the set N at step 803. Note that the shortest path from $n_4$ to $n_6$ is over $e_{56}$ (irrespective of an increased value for $e_{56}$'S link metric); $n_5$, $n_3$ and $n_2$ are not feasible as they will ultimately use $e_{56}$ in their shortest path to $n_6$ if they are not aware of the new $e_{56}$ state. Furthermore, $n_1$ can reach $n_4$ using nodes that are not affected by $e_{56}$'s status—this makes $n_4$ a feasible node (the only one in this case) for $n_1$ to $n_6$ traffic in the situation for a significant increase in $e_{56}$'s link metric. Such a feasible node is a candidate to act as an intermediate routing point and will become the sole node returned in set F from the BEST-ALTROUTE-NODE routine. This alternate routing point could then be used during times of congestion on $e_{56}$ or as an intermediary in traffic routing prior to network re-convergence upon $e_{56}$'s failure (or other status change). Such use may be continued thereafter as well.

Note that this second delivery continuation method (FIG. 8) requires the use of shortest path trees originating at nodes other than from a single source. This information could be computed at the source, communicated among the nodes, stored at a central location, etc. As will be readily understood by one skilled in the art, the ON-LINKSTATE-UPDATE (FIG. 7) and BEST-ALTROUTE-NODE (FIG. 8) methods can be combined into a larger scheme and used in a simultaneous manner for various traffic and message flows.

We next consider further refinements in the case where these methods are deployed 'over' an existing network. We will call the underlying network the 'physical' network and the network as viewed by the methods here the 'logical' network. The physical network, using its own routing system, may provide full connectivity in that (barring failures) every node can communicate with every other node, giving rise to a completely connected view (every node connected to every other node) of the network at the logical level. However, a single physical failure or network status change in the underlying network might correspond to several changes in the higher level fully connected logical system.

Figure 9:
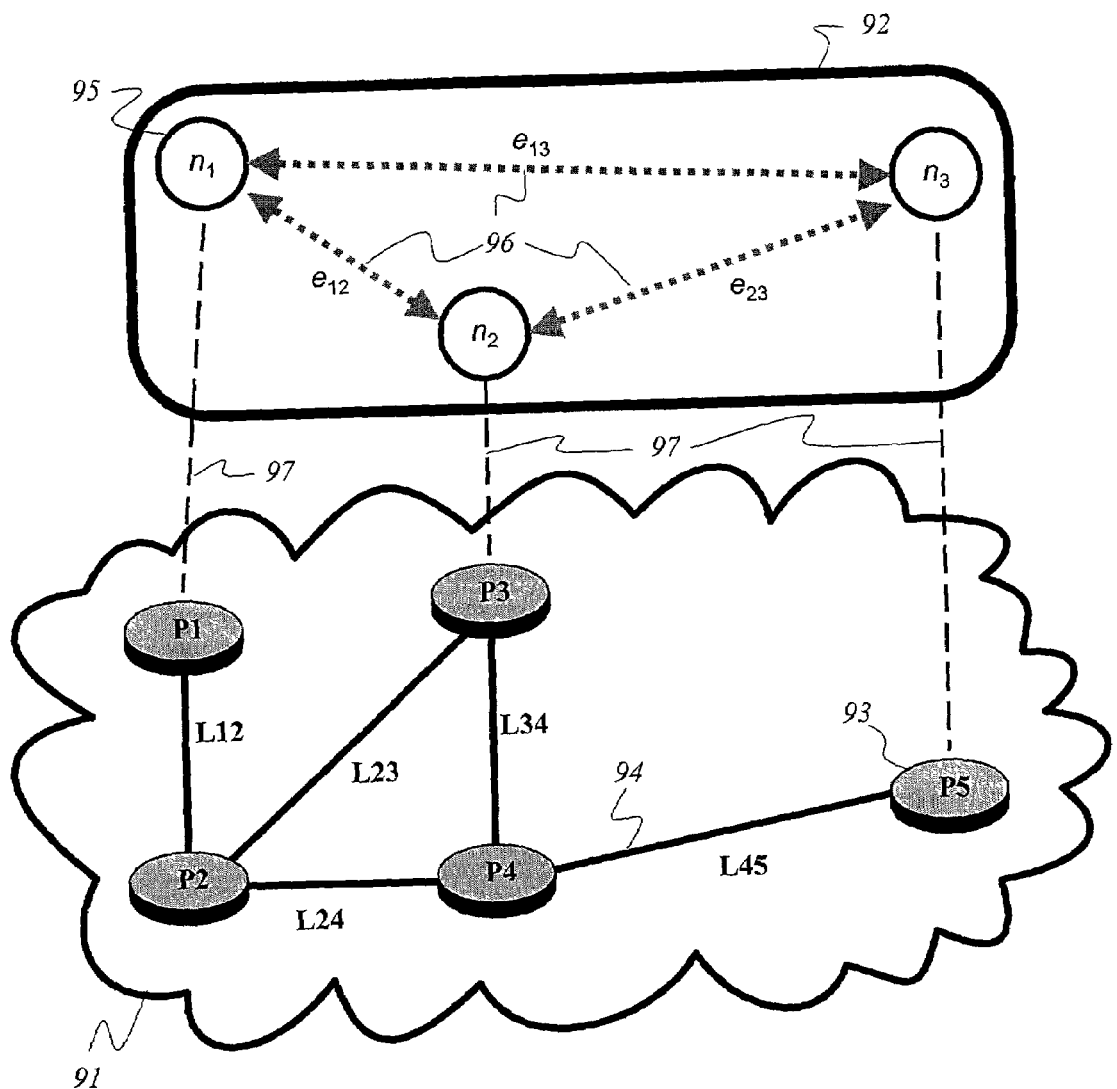
FIG. 9 depicts an example physical and logical network according to an embodiment of the present invention.

FIG. 9 shows an example physical network 91 and logical network 92 where some physical nodes 93 correspond (lines 97) with logical nodes 95. Physical (full-duplex) links 94 join physical nodes and (along with the routing method used by the physical network) provide logical connectivity 96 at the logical level. Note that failure of the single physical link L12 implies a failure of logical edges $e_{12}$ and $e_{13}$. Depending on the routing and physical link metrics, failure of physical link L34 might only affect $e_{12}$ or it might affect both $e_{12}$ and $e_{23}$. Thus it can be seen that a single physical status change might imply one or more (or none) logical link failures. Such a mapping of physical network changes to logical network state changes can be accommodated in the COMPLETE-TREESTATE and COMPLETE-TREESTATENODE methods disclosed by appropriately setting values in the X array based on the knowledge of the mapping of physical to logical links and controlling exploration via the PRED function in FIG. 4 or FIG. 5.

What is claimed is:

1. A method of computing routes on a network, which is composed of a plurality of nodes and a plurality of edges, representing network links, wherein each edge can be in a plurality of states, each edge having an edge metric value in each of its states, comprising the steps of
   (a) generating a plurality of shortest path trees from a start node of the plurality of nodes, each shortest path tree including a subset of nodes from the plurality of nodes, a set of distance values, and a subset of edges from the plurality of edges, each distance value corresponding to a node of the set of nodes, the subset of edges of the plurality of edges having corresponding edge metric values that make up a shortest path between the start node and each other node of the subset of nodes, wherein VSET is the subset of nodes that are currently included in the shortest path tree and ESET is the subset of edges that are currently in the shortest path tree, said generating step further comprising the steps of:
   (b) setting each edge of the plurality of edges to a state of the plurality of states for said each edge having a lowest edge metric value for said each edge;
   (c) initiating a current routing scenario (CASE N);
   (d) creating a shortest path tree (TREE N) for the current routing scenario (CASE N), wherein TREE N includes a start node at a distance value of zero;
   (e) filling the TREE N, by performing the steps of:
      1. if the shortest path tree of CASE N is complete, end CASE N and proceed to step (e)3(e) of prior CASE N unless there is no prior CASE N in which case stop, else proceed to step (e)2;
      2. select an edge (EMIN) having a minimum edge metric value from any node, Vx, in VSET to a node VMIN, wherein edge EMIN and node VMIN are not in TREE, Vx is in VSET, and EMIN is not in ESET;
      3. if additional higher-valued states are not available for EMIN or if further edge exploration is not allowed then proceed to step (e)4, else
         a. place EMIN into its next higher valued state;
         b. create a new routing scenario CASE N* with EMiN in said higher valued state;
         c. copy TREE N into TREE N*;
         d. recursively continue at step (e) wherein TREE N is TREE N*;
         e. return the edge metric value of EMIN in TREE N to its prior state and proceed to step (e)3;
      4. Add VMIN to VSET and add EMIN to ESET in TREE N, define the distance to node VMIN in TREE N as the sum of the edge metric value of EMIN and the distance value of Vx, and proceed step (e)1.

2. The method of claim 1 further comprising a step of sorting link metrics.

3. The method of claim 1 wherein the metric includes at least one of distance, delay, bandwidth and user-assigned metrics.

4. The method of claim 1 wherein the metrics are multiplicative.

5. The method of claim 1 wherein the steps are performed at a communications source.

6. The method of claim 1 wherein the steps are performed at one or more routers.

7. The method of claim 1 wherein the steps are performed only when a significant change in network conditions occur.

8. The method of claim 1 wherein the links are duplex links.

9. The method of claim 1 wherein each node performs steps (a) through (c) as a source node.

10. The method of claim 1 wherein routes are computed on-demand.

11. The method of claim 1 wherein routes are pre-computed.

12. A method for determining intermediate routing points on a network between a start node and a destination node during a change in edge metric status, the network being composed of nodes and links that may take on a plurality of possible metric statuses, comprising:
   (a) retrieving or computing a first shortest path tree from a starting node of the network and a second shortest path tree from the starting node of the network, the first shortest path tree being for a first network state before the change in edge metric status and the second shortest path tree being for a second network state after the change in edge metric status
   (b) determining a set of nodes common to said first and second shortest path trees from a graph isomorphism between the first and second shortest path trees;
   (c) for each node in the set of nodes, retrieving or computing a shortest path tree from said each node as a starting node for the first network state and retrieving or computing a shortest path tree from said each node as a starting node for the second network state; and
   (d) based upon the shortest path trees retrieved or computed in step c, determining a set of feasible intermediate routing nodes from the set of nodes, wherein, for each feasible intermediate routing node of the set of feasible routing nodes, a route from said each feasible intermediate routing node to the destination node is the same in the first network state and the second network state.

13. The method of claim 12 wherein the routes are determined during network non-convergence for continuous communications.

14. The method of claim 12 wherein the routes are determined during network convergence for computing potential explicit routing points.

* * * * *